United States Patent [19]
MacLennan

[11] Patent Number: 5,975,166
[45] Date of Patent: Nov. 2, 1999

[54] TILTING FELLER HEAD

[75] Inventor: Charles D. MacLennan, Hudson Heights, Canada

[73] Assignee: Prenbec Inc., Quebec, Canada

[21] Appl. No.: 08/940,377

[22] Filed: Sep. 30, 1997

[30] Foreign Application Priority Data

Sep. 30, 1996 [CA] Canada ................................. 2186798

[51] Int. Cl.⁶ ................................................ A01G 23/08
[52] U.S. Cl. .................... 144/4.1; 144/34.1; 144/335; 144/336
[58] Field of Search ................... 144/4.1, 24.13, 144/34.1, 335, 336, 338

[56] References Cited

U.S. PATENT DOCUMENTS

| 3,475,886 | 11/1969 | Hart | 144/336 |
|---|---|---|---|
| 3,735,786 | 5/1973 | Vit | 144/338 |
| 3,856,060 | 12/1974 | Savage et al. | 144/336 |
| 3,868,982 | 3/1975 | Kurelek et al. | 144/338 |
| 4,083,463 | 4/1978 | Ericsson | 144/34.1 |
| 4,270,586 | 6/1981 | Hyde et al. | 144/336 |
| 4,340,119 | 7/1982 | MacDonald . | |
| 4,412,569 | 11/1983 | Barnett et al. | 144/338 |
| 4,412,777 | 11/1983 | Forslund | 144/4.1 |
| 4,537,236 | 8/1985 | Kulju . | |
| 4,552,191 | 11/1985 | Kuusilinna . | |
| 4,800,936 | 1/1989 | Pumies et al. | 144/4.1 |
| 4,838,328 | 6/1989 | Herlof | 144/336 |
| 4,881,582 | 11/1989 | Ketonen | 144/34.1 |
| 5,101,872 | 4/1992 | Scheuren | 144/34.1 |
| 5,441,090 | 8/1995 | Hill et al. . | |
| 5,495,898 | 3/1996 | McGugan . | |
| 5,595,225 | 1/1997 | Gilbert et al. | 144/4.1 |
| 5,709,254 | 1/1998 | Argue | 144/336 |
| 5,727,610 | 3/1998 | Isley | 144/4.1 |

FOREIGN PATENT DOCUMENTS

| 955153 | 9/1974 | Canada . | |
|---|---|---|---|
| 1072417 | 2/1980 | Canada . | |
| 1277927 | 12/1986 | U.S.S.R. | 144/336 |
| 1289540 | 2/1987 | U.S.S.R. | 144/336 |
| 1493167 | 7/1989 | U.S.S.R. | 144/336 |
| 1568944 | 6/1990 | U.S.S.R. | 144/336 |
| 1604254 | 11/1990 | U.S.S.R. | 144/336 |

Primary Examiner—W. Donald Bray
Attorney, Agent, or Firm—Birch, Stewart, Kolasch & Birch, LLP

[57] ABSTRACT

A tree harvester head having a mounting bracket at the back of the type allowing the head to be tilted. The bracket is used to mount the head on the boom of a mobile vehicle. Cooperating mounting members are provided on the head and bracket for rotatably mounting the head on the bracket. Rotating members are provided on the head and bracket for rotating the head relative to the bracket. Hydraulic drive elements are provided on the head for operating the rotating member on the head to rotate the head. A method for cutting trees using the harvester head involves the steps of cutting trees in three adjacent rows or swaths and laying all the cut trees in or adjacent the central swath, with their butt ends all facing in the same direction, for pickup by a forwarder.

8 Claims, 8 Drawing Sheets

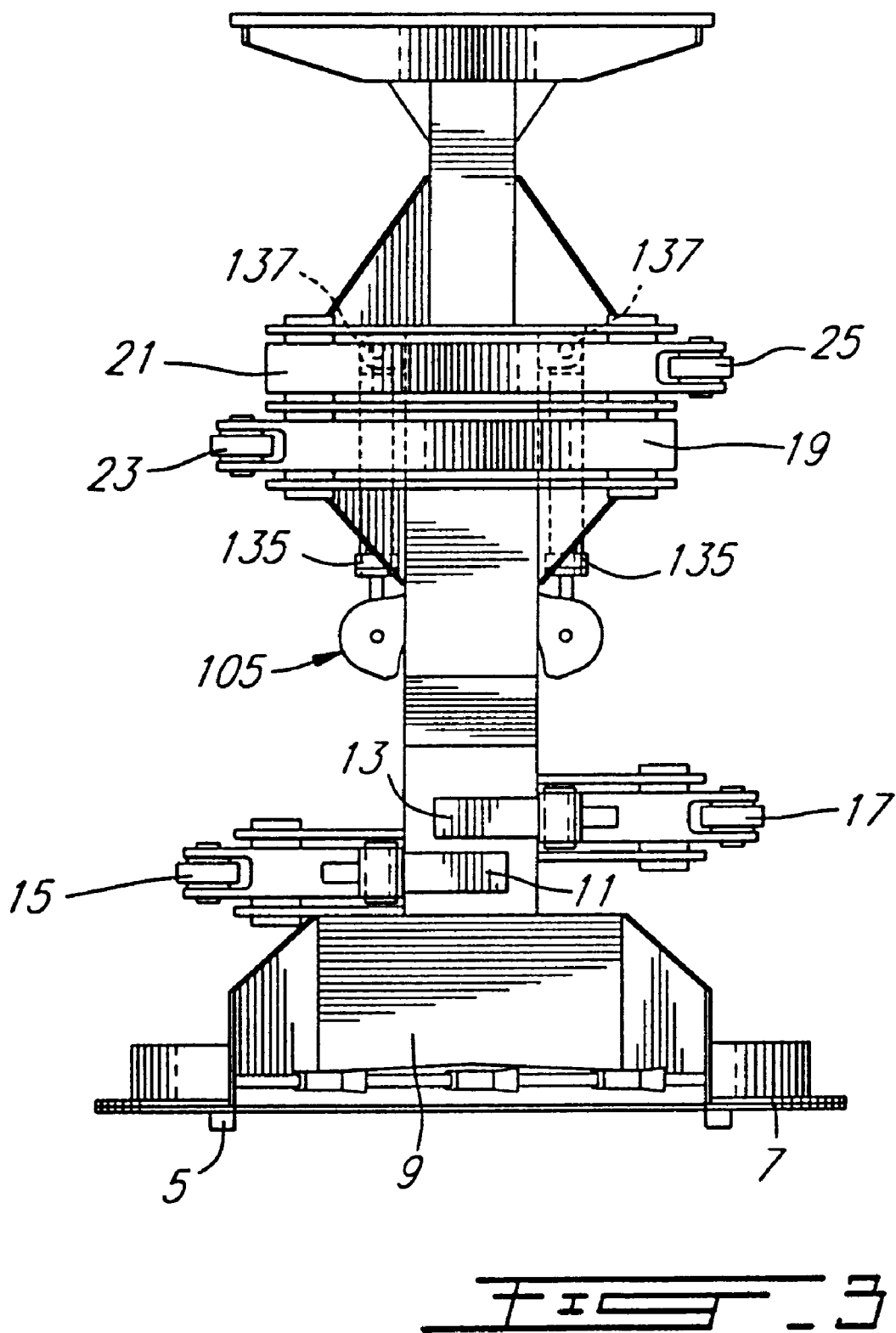
FIG_3

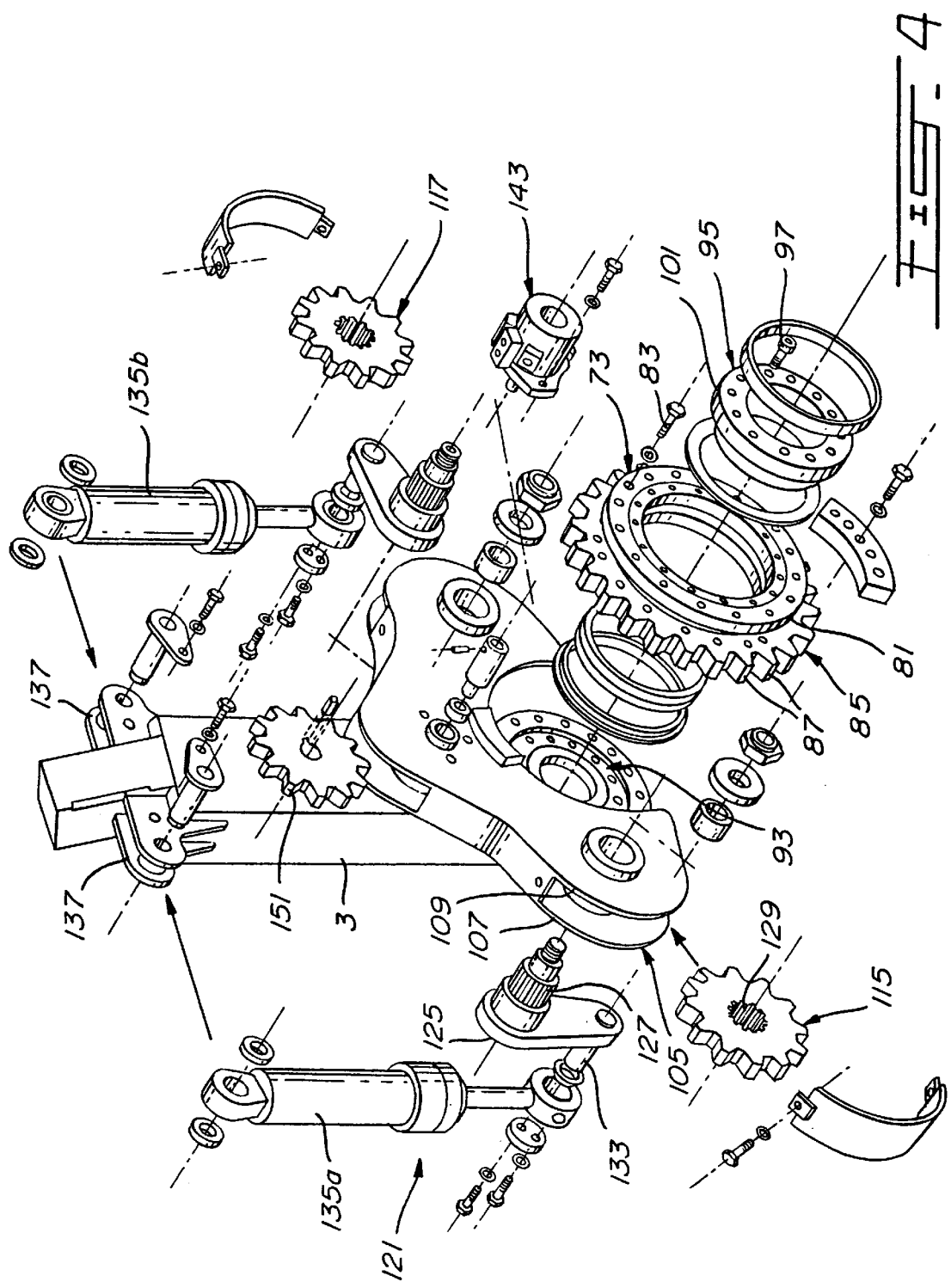

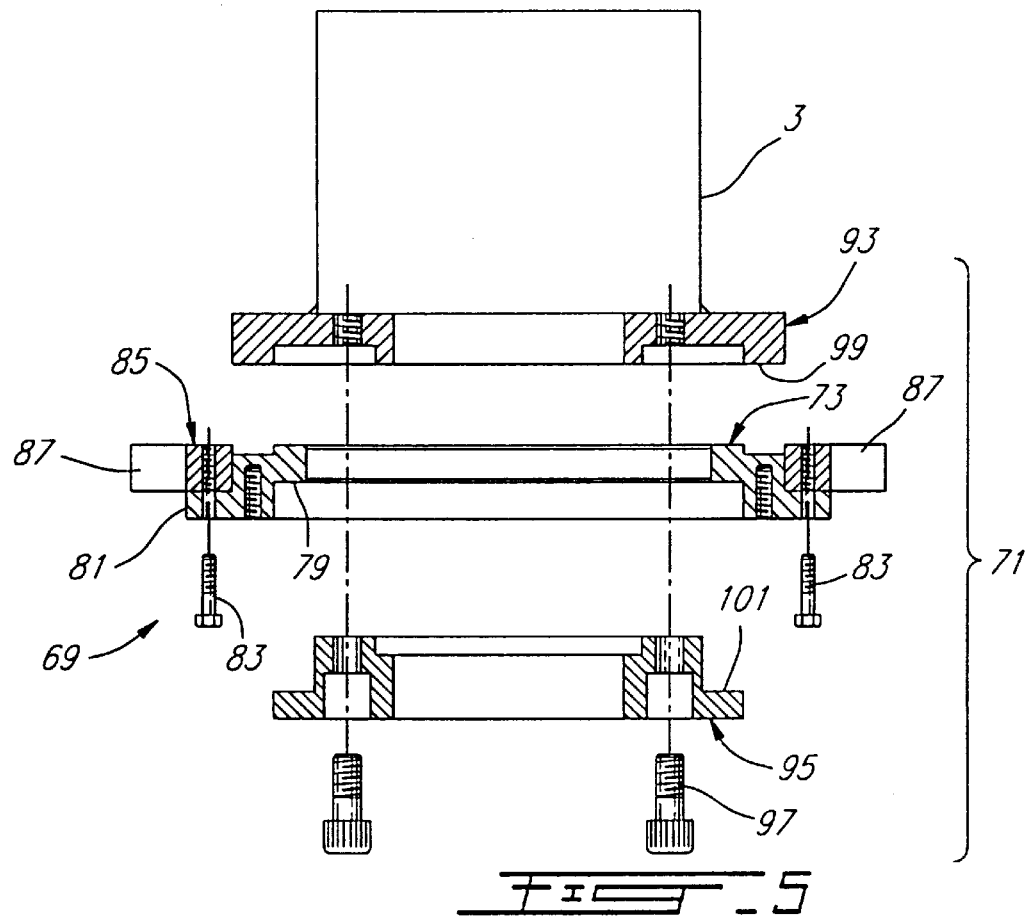
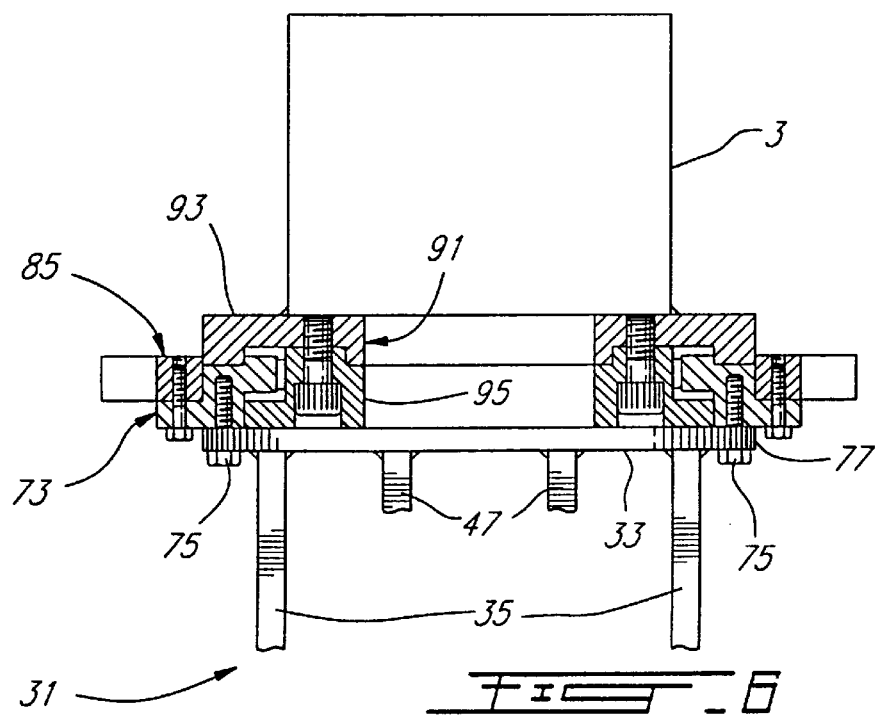

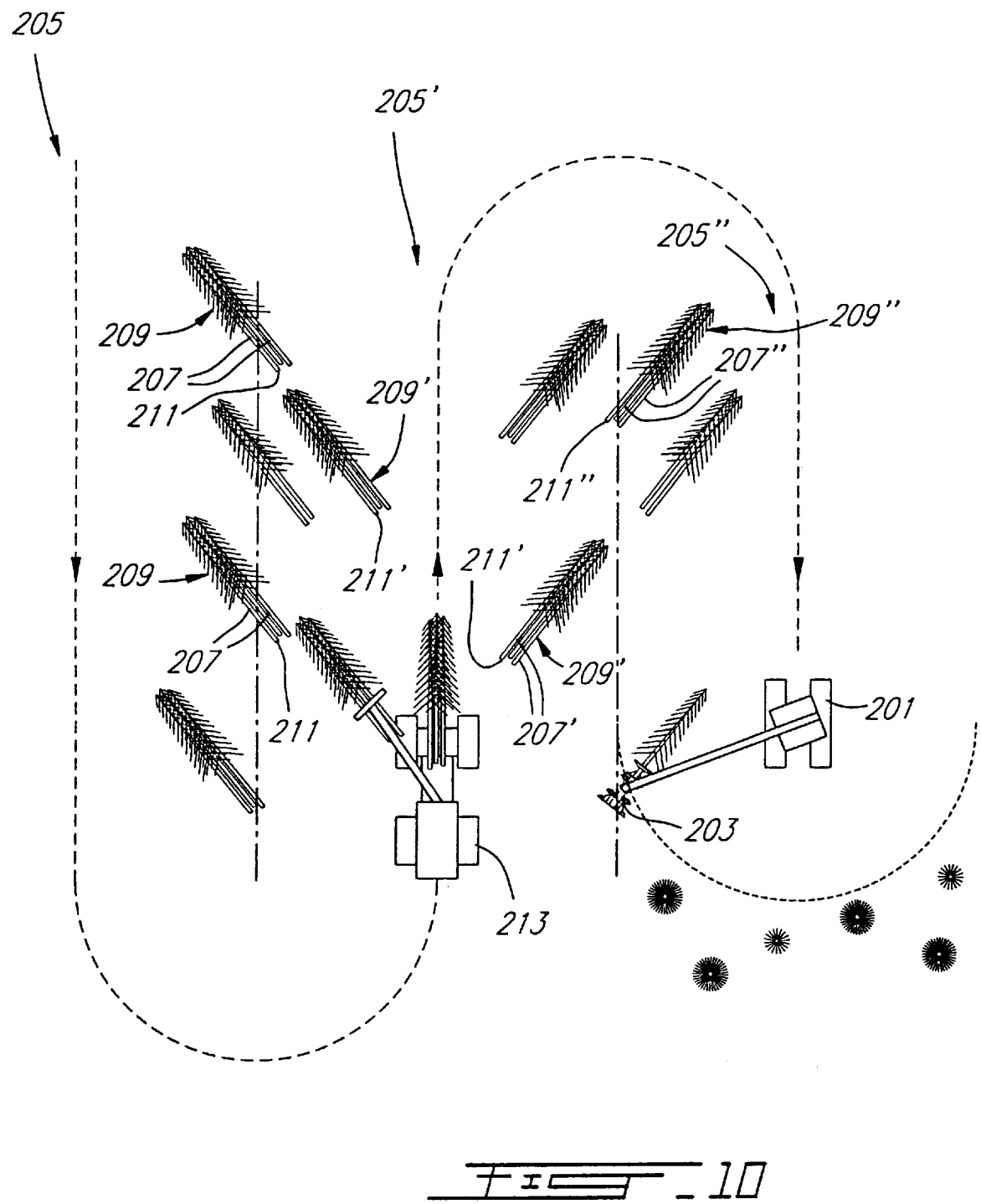

ND

TILTING FELLER HEAD

BACKGROUND OF THE INVENTION

1. Field of the Invention

This invention is directed toward an improved tree harvesting head. The invention is more particularly directed toward an improved tree harvesting head of the type that can be rotated about an axis that is perpendicular to the longitudinal axis of the head.

The invention is also directed toward a method of harvesting employing a harvesting machine with the tree harvesting head of the present invention.

2. Description of the Prior Art

Tree harvesting heads having a central post with a circular saw at the bottom, the plane of the saw transverse to the axis of the post, tree grapple means above the saw head on the post and tree accumulator means on the post above the grapple means, are known. The head has a bracket on the back of the post and a pivot pin mounts the head, via the bracket, on the end of a boom carried by a mobile vehicle. The axis of the pivot mounting is horizontal, the pin extending transverse to the boom and allowing the head to be tilted from an upright, vertical position to a generally horizontal position while generally aligned with the boom. This allows the operator to place accumulated cut trees, held by the head, on the ground. Usually the boom must be rotated, and/or the vehicle moved, to place the trees in the desired position on the ground. This is energy inefficient, however, given the weight of the boom and/or the vehicle.

It is known to mount the head on the boom with both the above tilt mounting and a rotatable mounting allowing the head to be rotated out of alignment with the boom. The rotatable mounting is located between the bracket and the head. Such a mounting allows the trees to be placed in the desired position on the ground by rotating the head about the rotatable mounting. Since the head is lighter than the boom or the vehicle, this arrangement is much more energy efficient. Examples of such heads are shown in U.S. Pat. Nos. 4,552,191 and 5,441,090 by way of example. These known heads, however, are quite poorly designed, particularly with regard to the type and size of the rotatable mounting employed and to the drive means for rotating the head. The rotatable mounting is quite small in diameter and thus subject to early failure. The drive means also employ large rotatable members on the head adding to its weight and making it less efficient.

SUMMARY OF THE INVENTION

It is the purpose of the present invention to provide a tree harvesting head of the type having a pivot mounting allowing the head to pivot or tilt in the plane of the boom and a rotatable mounting allowing the head to rotate out of the plane of the boom, with an improved rotatable mounting. The improved rotatable mounting is much stronger than known mountings due to its unique design. The invention is also directed toward providing a tree harvesting head of the above type having improved means for rotating the head and improved drive means for operating the rotating means. To this end the head of the present invention employs a large diameter fixed gear on the bracket. At least one small rotatable gear on the head meshes with the fixed gear on the bracket, and when rotated, rotates the head about the mounting. The drive means for operating the small rotatable gear is carried on the head and is quite compact. Since only small gears are rotated, the rotating operation is quicker and also more energy efficient.

It has also been discovered that tree harvesting can be more efficiently carried out with the a tree harvester having the improved head. In accordance with the present invention, the tree harvester is used to cut down trees in three adjacent rows or swaths. Each row is about as wide as the swing of the boom of the harvester. The improved head allows the harvester to place the cut trees from all three rows in or adjacent the middle row with the butt ends all pointing in one direction. This means that all the cut trees from the three rows are all aligned in the same general direction and are located in the same row making it very efficient for a forwarder to collect and transport the trees.

The invention is particularly directed toward a tree harvester head of the type having a central post, a rotatable saw head at the bottom of the post, and tree grapple means on the post above the saw head. The tree harvester head has bracket means at the back of the post for use in connecting the head to a boom on a mobile vehicle for pivotal movement in a plane generally aligned with the boom. The bracket means are rotatably connected to the post by axle means allowing the post to rotate in a plane transverse to the boom. Rotating means are provided for rotating the post about the axle means. There are drive means for operating the rotating means, the drive means carried on the post.

The invention is also particularly directed toward a method for use in harvesting trees having the steps of cutting trees in three adjacent rows and laying all the cut trees in bunches in or adjacent the central row with their butt ends all facing in the same general direction.

BRIEF DESCRIPTION OF THE DRAWINGS

The invention will now be described in detail having reference to the accompanying drawings in which:

FIG. 3 is a front view of the harvester head;

FIG. 4 is an exploded view of the post rotating means;

FIG. 5 is an exploded detail view of the post mounting means;

FIG. 6 is an assembled detail view of the post mounting means;

FIG. 10 is a plan schematic view showing the harvesting of trees with the harvesting head of the present invention.

DESCRIPTION OF THE PREFERRED EMBODIMENTS

Figure 1:
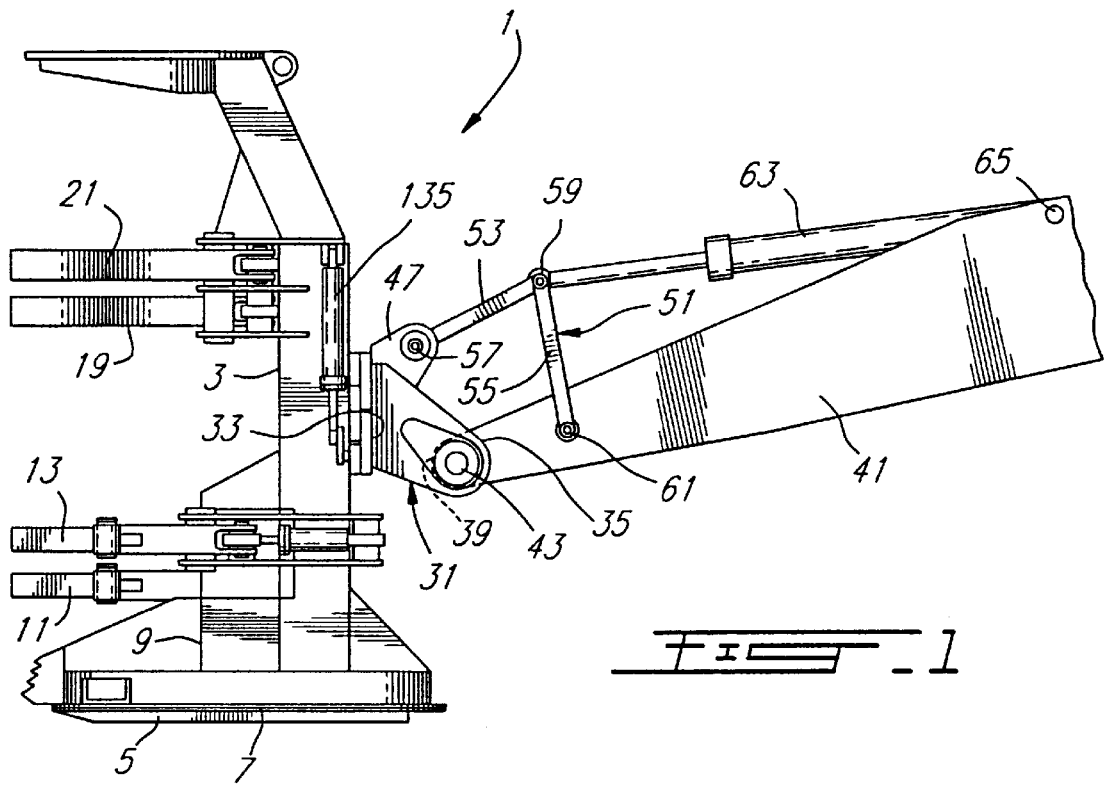
FIG. 1 is a side view of the harvester head.
Figure 2:
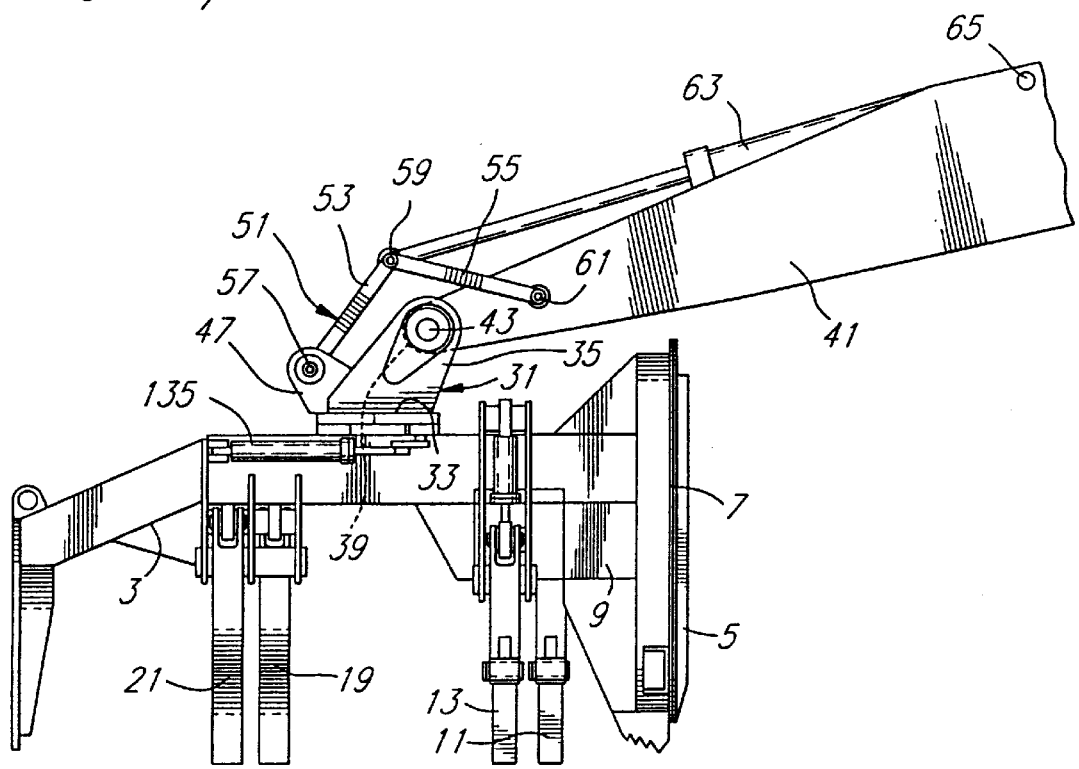
FIG. 2 is a side view of the harvester head showing it tilted.

The tree harvesting head 1, as shown in FIGS. 1 to 3, has a central post 3 that, when harvesting trees, is normally in a vertical position. A circular saw 5 is mounted at the bottom of the post 3 for rotation about an axis parallel to the longitudinal axis of the post. A butt plate 7 is mounted on the post 3 just above the saw 5. A motor 9 is mounted on the butt plate 7 for operating the saw 5. A pair of grab arms 11, 13 are mounted on opposite sides of the post 3 above the butt plate 7. Hydraulic means 15, 17, connected between the ends of the arms 11, 13 and the post 3, open and close the grab arms 11, 13. A pair of larger accumulator arms 19, 21 are mounted on opposite sides of the post 3 above the grab arms 11, 13. Hydraulic means 23, 25 are connected between the ends of the accumulator arms 19, 21 and the post 3 for opening and closing the accumulator arms.

The harvesting head 1 includes a mounting bracket 31 at the back of the post 3 between the grab arms 11, 13 and the accumulator arms 19, 21. The mounting bracket 31 has a forwardly located circular base 33 and a pair of main, parallel, bracket arms 35 extending rearwardly and downwardly from the back of the base 33. The free ends of the bracket arms 35 are adapted to be connected to the end 39 of a boom 41 by a pivot pin 43. The boom 41 is carried by a mobile vehicle (not shown). A pair of secondary, parallel, bracket arms 47 extend upwardly and rearwardly from the base 33, between the main bracket arms 35. A linkage assembly 51 is adapter to connect the free ends of the secondary bracket arms 47 to the boom 41. The linkage assembly 51 comprises a front link 53 and a rear link 55. The front end of the front link 53 is attached by a pivot pin 57 to the free ends of the secondary bracket arms 47. The rear end of the front link 53 is attached by a pivot 59 to the front end of the rear link 55. The rear end of the rear link is attached by pivot pin 61 to the boom behind the pivot pin 43. The front end of a hydraulic cylinder 63 is attached to the pivot pin 59. The rear end of the cylinder 63 is attached to the top of the boom 41 by a pivot pin 65 well to the rear of pivot pin 61. Operation of the cylinder 63 will tilt the head 1 about pivot pin 41 between a vertical position shown in FIG. 1 and a tilted, generally horizontal, position shown in FIG. 2.

The post 3 of the harvesting head 1 is rotatably mounted on the base 33 of the mounting means bracket 31. To this end, cooperation mounting means 69, 71, shown in FIGS. 4 to 6, are provided on the bracket 31 and the post 3. The mounting means 69 on the bracket. 31 comprises an axle ring 73 fixed by bolts 75 to the circular base 33 adjacent its peripheral edge 77. The axle ring 73 has an inwardly offset inner flange 79 and an outwardly offset outer flange 81. Bolted to the inside of the outer flange 81 of the axle ring 73, by bolts 83, is a fixed gear 85 having gear teeth 87 on its peripheral edge.

The mounting means 71 on the post 3 comprise a two part, tubular, axle 91 fixed to the back of the post for rotatable mounting on the axle ring 73. The axle 91 has an inner ring part 93 fixed to the back of the post 3 by welding or other suitable means. The axle 91 also has an outer ring part 95 bolted by bolts 97 to the inner part 93. Both the inner and outer axle parts 93, 95 have outer flanges 99, 101 respectively between which the inner flange 79 of the fixed axle ring 73 is mounted. The axle 91, and thus the attached post 3, is rotatably mounted on the fixed axle ring 73.

The axle ring 73, the fixed gear 85, and the axle 91 are mounted within a housing 105, shown in FIG. 4, mounted on the back of the post 3. The housing 105 has two parallel plates forming walls 107, 109 suitably held together between which the rotatable mounting means 69, 71 are located.

Figure 7:
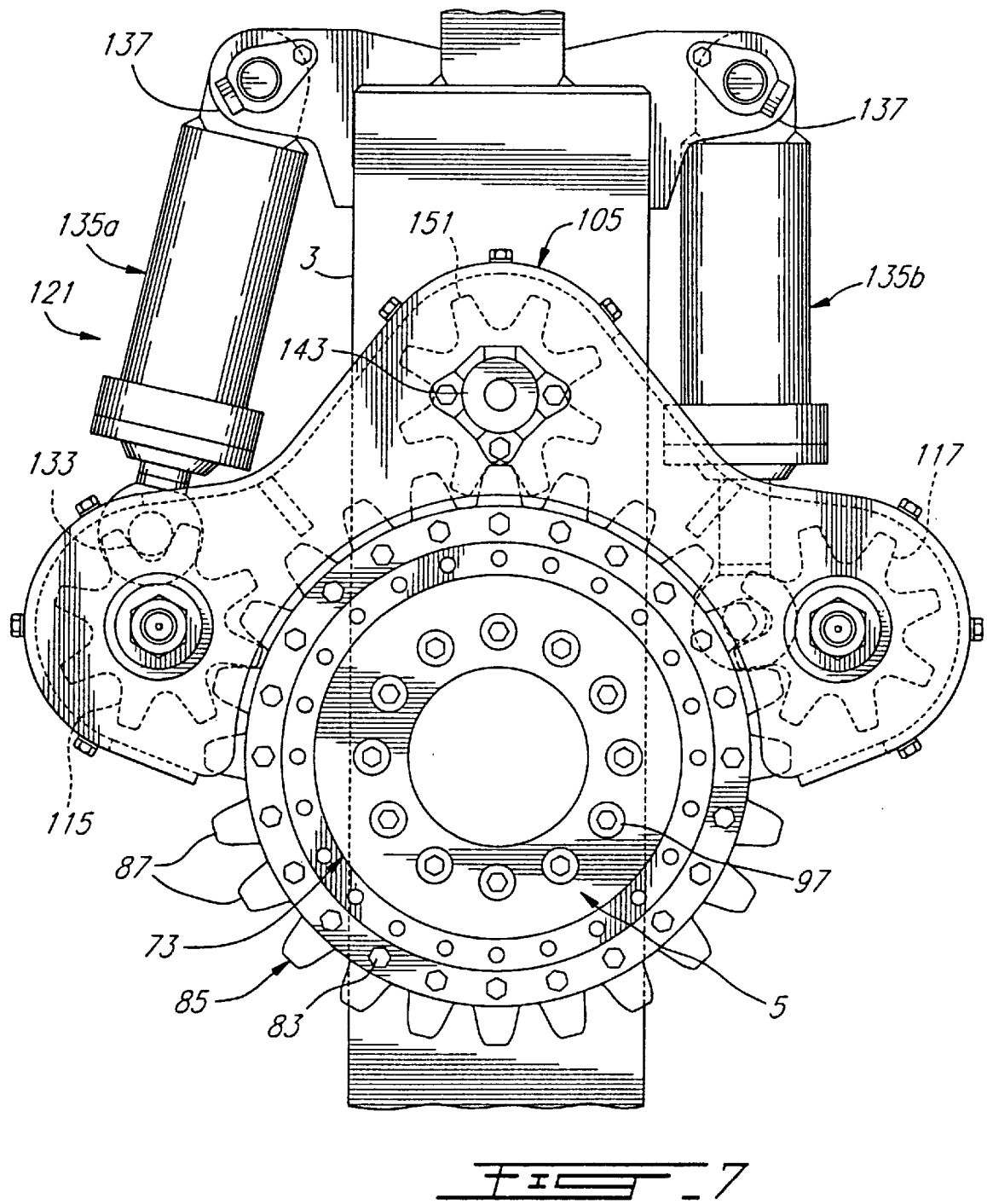
FIG. 7 is a detail back view, in partial cross-section, showing the post rotating means.

Rotating means 113 are provided for rotating the post 3 about the fixed axle ring 73. The rotating means 113 can comprise, as shown in FIGS. 4 and 7, a drive gear 115, 117 located on each upper side of the fixed gear 85. The fixed gear 85 also forms part of the rotating means 113 and the teeth of the drive gears 115, 117 mesh with the teeth 87 on the fixed gear 85. The drive gears 115, 117 are mounted within the housing 105 as will be described.

Drive means 121 are provided on the harvesting head for operating the rotating means 113. The drive means 121 for each drive gear 115, 117 is the same so only one will be described in detail. The drive means 121 has a crank arm 125 with a splined shaft 127 at one end extending transversely therefrom. The splined shaft 127 is mounted within a central mating splined hole 129 in the drive gear 115. The ends of the splined shaft 127, on either side of the splines, are rotatably mounted within the walls 107, 109 of the housing 105. The other end of the crank arm 125 has a pivot pin 133 extending transversely therefrom in a direction opposite to the splined shaft 127. The pivot pin 133 is rotatably mounted to one end of a hydraulic cylinder 135. The other end of the hydraulic cylinder 135 is mounted to brackets 137 on the post 3 located above the housing 105 to have the cylinder in a generally vertical position. As will be described in more detail, operation of the hydraulic cylinder 135 will rotate the crank 125, thus rotating the drive gear 115 and causing it to traverse about the periphery of the fixed gear 85. As the gear 115 moves along fixed gear 85, the post 3 rotates in one direction or the other about the axle ring 73. Drive gear 117 is similarly operated, the two gears 115, 117 acting in unison.

Figure 8:
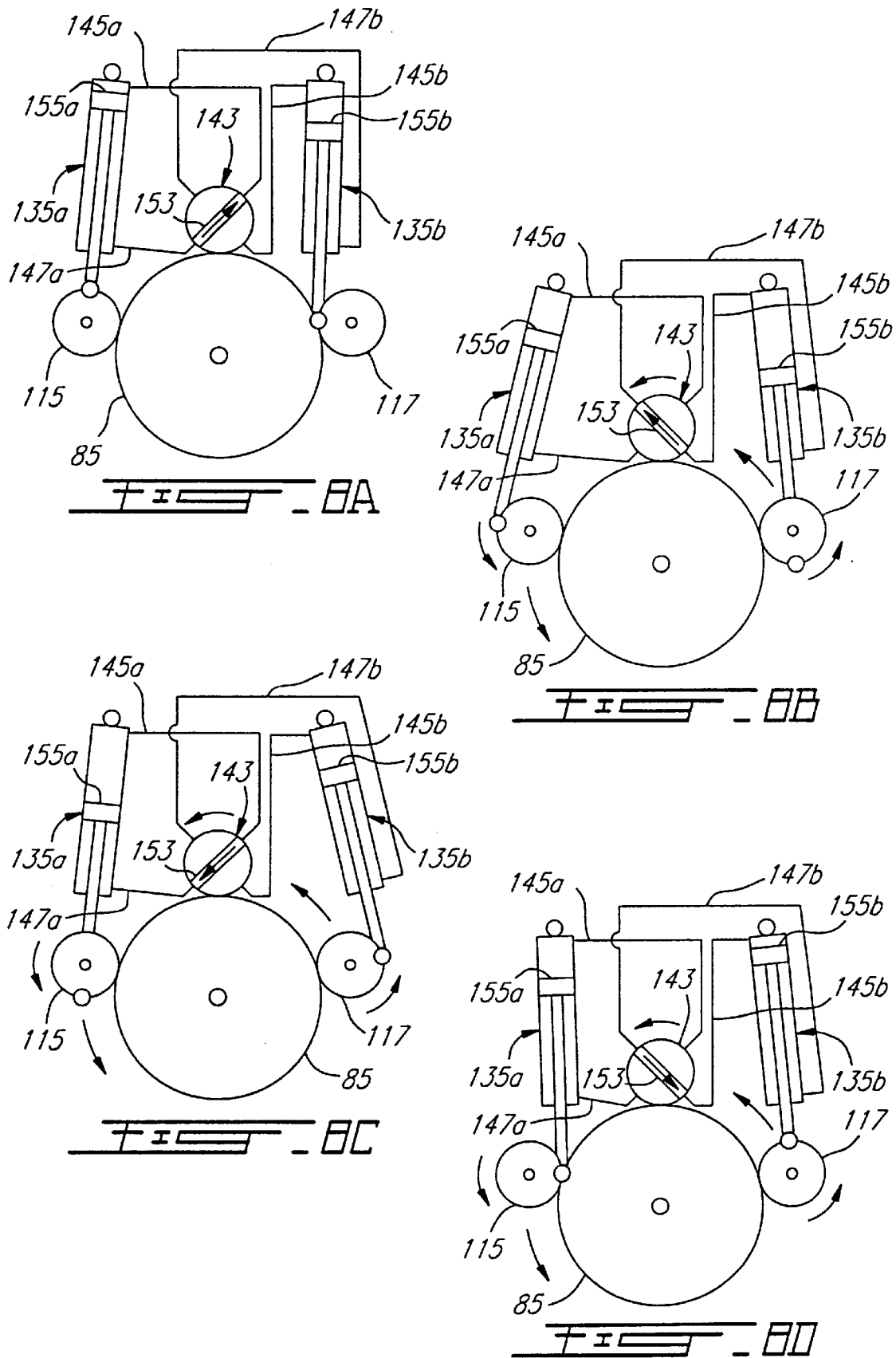
FIGS. 8A through 8D are schematic views showing the operation of the timing valve.

The hydraulic cylinders 135 for operating both drive gears 115, 117 operate in unison. As shown in FIG. 8, the cylinder 135*a*, associated with gear 115, is connected to the hydraulic circuit of the mobile vehicle, through a control valve 143, via top and bottom lines 145*a*, 147*a*. The hydraulic cylinder 135*b* associated with the gear 117 is connected to the hydraulic circuit, through control valve 143, via top and bottom lines 145*b*, 147*b*. The control valve 143 includes a timing feature for changing the direction the fluid is directed to the cylinders 135*a*, 135*b* from the pump (not shown) dependent on the position of the pistons within the cylinders. The timing feature has a timing gear 151 mounted within the housing 105 above the fixed gear 85 and meshing with it. The timing gear 151 rotates as the post 3 and the attached housing 105 are rotated about the fixed gear 85. The timing gear 151 is connected to a timing valve 153 forming part of the control valve 143 in the hydraulic circuit. Rotation of the gear 151 will rotate the timing valve 153 to change the direction fluid is directed to the cylinders.

As shown in FIG. 8*a*, the hydraulic system is set up initially with the piston 155*a* of cylinder 135*a* at the top and the piston 155*b* of cylinder 135*b* midway down. The timing valve 153 is shown in position to direct the flow of fluid to cylinder 135*a* to the top through line 145*a* while flow of fluid to cylinder 135*b* is also to the top. When it is desired to rotate the post to the left, the hydraulic circuit is opened and fluid flows through valve 143 to the top of both cylinders 135*a*, 135*b* to rotate both gears 115, 117 counterclockwise. As both gears rotate counterclockwise, they traverse counterclockwise on the fixed gear 85 rotating the post to the left. As the post rotates, the timing gear 151 also rotates and rotates the timing valve 153 to the position shown in FIG. 8*b* where fluid is now directed to the bottom of the cylinder 135*b* instead of to the top at about the same time that the piston 155*b* reaches the bottom of the cylinder 135*b*. Continued rotation of the post brings the timing valve 153 to the position shown in FIG. 8*c* where it changes the flow of fluid to cylinder 135*a* from the top line 145*a* to the bottom line 147*a* as the piston 155*a* reaches the bottom of the cylinder 135*a*.

Figure 9:
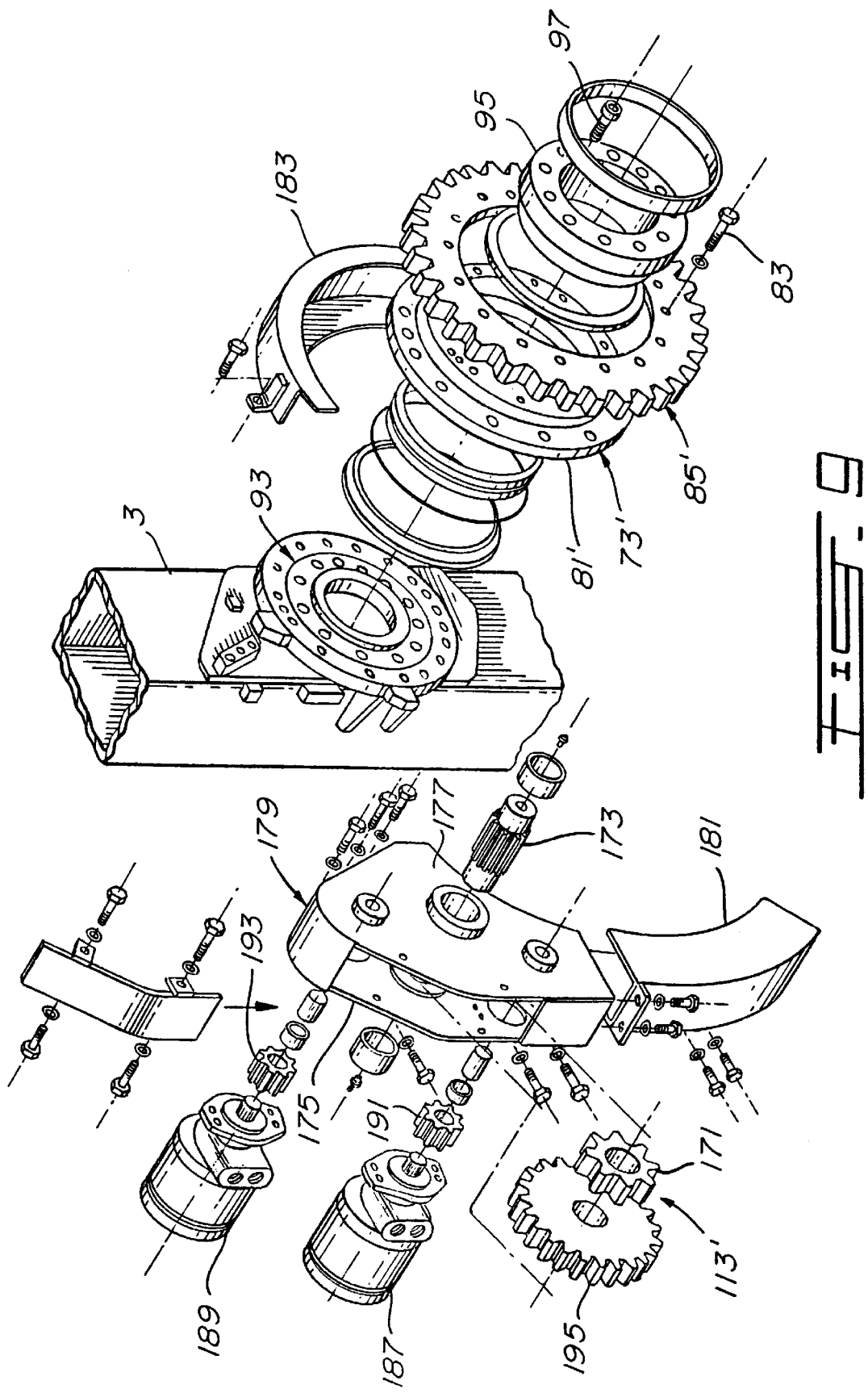
FIG. 9 is an exploded view of another embodiment of the rotating and drive means.

In another embodiment of the invention as shown in FIG. 9, the rotating means 113' can comprise a single drive gear 171 mounted on a splined shaft 173 which in turn is rotatably mounted at its ends between the walls 175, 177 of a small housing 179 fixed both to the back and to the side of the post 3. The small housing 179 can have curved extensions 181, 183 to cover the cooperating rotatable mounting means. Two small hydraulic motors 187, 189 are mounted on the front of the small housing 179, adjacent the post. Each motor 187, 189 drives a small power gear 191, 193 mounted in the housing 179. The small power gears 191, 193 drive a larger idler gear 195 mounted on the splined shaft 173. Rotation of the splined shaft 173 in either direction will cause rotation of the drive gear 171 about the fixed gear 85' and thus cause rotation of the post 3'. In this embodiment, because of the use of the idler gear 195, the fixed gear 85' may be mounted on the axle ring 73' on the outside surface of the outer flange 81' of the ring, instead of the inside surface as shown in FIGS. 5 and 6. This is done in order to provide clearance for the idler gear 195 while mating the drive gear 171 with the fixed gear 85'.

This second embodiment, using the small hydraulic motors adjacent the side of the post, allows the post to rotate through approximately 270°. The first embodiment, using the two spaced part hydraulic cylinders, allows the post to rotate through approximately 240°.

The ability to both tilt and to rotate the harvesting head has led to the discovery of a very efficient method of harvesting trees. The method comprises cutting the trees in a stand in units of three adjacent rows or swaths with the harvester 201 moving up and down the rows in zigzag fashion, as shown in FIG. 10. Each row has an approximate width equal to the side-to-side swing of the harvester head 203. As shown by the dashed line in FIG. 10, the harvester starts at the top of the first row 205 and moves down the row cutting and accumulating the trees 207 in the row in bunches 209. As each bunch 209 of cut trees is accumulated in the first row of trees being cut, it is dropped in or adjacent the second row 205' with the butt ends 211 of the trees in the bunches pointing in the same general direction. After cutting the first row 205, the harvester 201 moves up the second row 205' cutting and depositing the trees 207' therein in the second row in bunches 209' again, however, with the butt ends 211' all pointing in the same direction as the butt ends 211 of the trees cut in the first row. When the second row 205' is completed, the harvester 210 moves down the third row 205" cutting the trees 207" in this row and depositing the trees from this third row, in bunches 209", in or adjacent the second row 205' and again with the butt ends 211" all facing in the same direction as the other butt ends. After the trees in the three row unit have been cut and the harvester moves onto a second three row unit, a forwarder 213 moves up the second row 205' quickly loading all the trees cut from all three rows. Loading is quickly accomplished since the butt ends of the trees all point in the same direction. The cut trees can be arranged as described to facilitate operation by a forwarder because of the harvester head's ability to both tilt and to rotate while tilted, permitting the placement of the trees in the desired position.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A tree harvester head of the type having a central post, a cutting device at the bottom of the post, and tree grapple means on the post above the cutting device, the cutting device having bracket means at the back of the post for use in connecting the head to a boom on a mobile vehicle for pivotal movement in a plane generally aligned with the boom, the bracket means rotatably connected to the boom by mounting means allowing the post to rotate in a plane transverse to the boom, rotating means for rotating the post about an axis extending through the mounting means and perpendicular to the transverse plane of the post, and drive means carried on the post for operating the rotating means, the rotating means including a pair of rotatable drive gears mounted on the back of the post and a fixed gear carried by the bracket means coaxial with the axis of the mounting means, each of the drive gears being rotatable about an axis parallel to the axis extending through the mounting means and being in drive relationship with the fixed gear, and the drive means selectively rotating the drive gears whereby the harvester head can be rotated in the transverse plane.

2. A tree harvesting head as claimed in claim 1, wherein the mounting means comprises an axle ring fixed to the bracket and axle means fixed on the post for bearing on either side of the axle ring to rotatably mount the post on the axle ring.

3. A tree harvesting head as claimed in claim 1, wherein the drive means for each drive gear comprise a hydraulic cylinder mounted on the post and connected to a crank arm, the crank arm rotating the drive gear as a piston in the cylinder moves up and down.

4. A tree harvesting head as claimed in claim 3, including timing means for changing the direction of flow through the cylinder as the piston reaches the top and bottom of the cylinder.

5. A tree harvesting head as claimed in claim 4, wherein the timing means comprises a timing gear on the back of the post and meshing with the fixed gear, movement of the post rotating the gear to cause change in the direction of flow.

6. The tree harvester head as defined in claim 1, wherein the pair of drive gears are mounted to mesh with at least an intermediate gear which in turn meshes with the fixed gear.

7. A tree harvesting head as claimed in claim 2, wherein the rotating means has a rotatable drive gear mounted on the back of the post and a fixed gear carried by the axle ring, the drive gears meshing with the fixed gear; the drive means selectively rotating the drive gears.

8. A tree harvesting head as claimed in claim 7, wherein the drive means comprise a pair of motor gears for rotating the drive gear in either direction and a hydraulic motor for driving each motor gear.

* * * * *

UNITED STATES PATENT AND TRADEMARK OFFICE
CERTIFICATE OF CORRECTION

PATENT NO. : 5,975,166
DATED : November 2, 1999
INVENTOR(S) : Charles D. MacLennan It is certified that error appears in the above-identified patent and that said Letters Patent is hereby corrected as shown below:

Claim 1:
Lines 3 and 4, change "cutting device" to -- head --

Signed and Sealed this

Twenty-first Day of August, 2001

*Attest:*

*Attesting Officer*

NICHOLAS P. GODICI
*Acting Director of the United States Patent and Trademark Office*